US012442571B2

United States Patent
Van Vliet et al.

(10) Patent No.: US 12,442,571 B2
(45) Date of Patent: Oct. 14, 2025

(54) HIGH-COP HEAT PUMP WITH THERMOCHEMICAL STORAGE SYSTEM

(71) Applicant: Nederlandse Organisatie voor toegepast-natuurwetenschappelijk onderzoek TNO, s-Gravenhage (NL)

(72) Inventors: Laurens Daniël Van Vliet, The Hague (NL); Ruud Cuypers, Rijswijk (NL)

(73) Assignee: NEDERLANDSE ORGANISATIE VOOR TOEGEPAST-NATUURWETENS CHAPPELIJK ONDERZOEK TNO, 's-Gravenhage (NL)

( * ) Notice: Subject to any disclaimer, the term of this patent is extended or adjusted under 35 U.S.C. 154(b) by 487 days.

(21) Appl. No.: 17/904,149

(22) PCT Filed: Feb. 19, 2021

(86) PCT No.: PCT/NL2021/050116
§ 371 (c)(1),
(2) Date: Aug. 12, 2022

(87) PCT Pub. No.: WO2021/167463
PCT Pub. Date: Aug. 26, 2021

(65) Prior Publication Data
US 2023/0103235 A1    Mar. 30, 2023

(30) Foreign Application Priority Data
Feb. 19, 2020   (EP) ................................. 20158252

(51) Int. Cl.
*F25B 25/02*   (2006.01)
*F25B 17/08*   (2006.01)
(Continued)

(52) U.S. Cl.
CPC .............. *F25B 25/02* (2013.01); *F25B 17/08* (2013.01); *F25B 17/10* (2013.01); *F25B 30/02* (2013.01); *F25B 30/06* (2013.01); *F25B 2400/24* (2013.01)

(58) Field of Classification Search
CPC .......... F25B 25/02; F25B 17/08; F25B 17/10; F25B 30/02; F25B 30/06; F25B 2400/24
(Continued)

(56) References Cited

U.S. PATENT DOCUMENTS

| 2006/0101847 A1* | 5/2006 | Henning | ................. F25B 30/04 62/480 |
| 2010/0205981 A1 | 8/2010 | Bolin et al. | |
| 2019/0383563 A1 | 12/2019 | He et al. | |

FOREIGN PATENT DOCUMENTS

EP    3299759 A1    3/2018

OTHER PUBLICATIONS

International Search Report issued May 11, 2021 in PCT/NL2021/050116.
(Continued)

*Primary Examiner* — Steve S Tanenbaum
(74) *Attorney, Agent, or Firm* — Ice Miller LLP

(57) ABSTRACT

The invention is directed to energy storage and supply system (100) comprising a combination of a heat pump (HP) (2) and a thermochemical storage (TCS) (1) unit, adapted for storing and supplying energy. In a further aspect, the invention is directed to a method for operating the energy storage and supply system (100), wherein said method comprises charging and discharging phases which both comprise providing a HP warm stream by the HP and leading said HP warm stream to the TCS unit to respectively thermally charge and discharge said TCS unit.

20 Claims, 6 Drawing Sheets

Figure 1A:
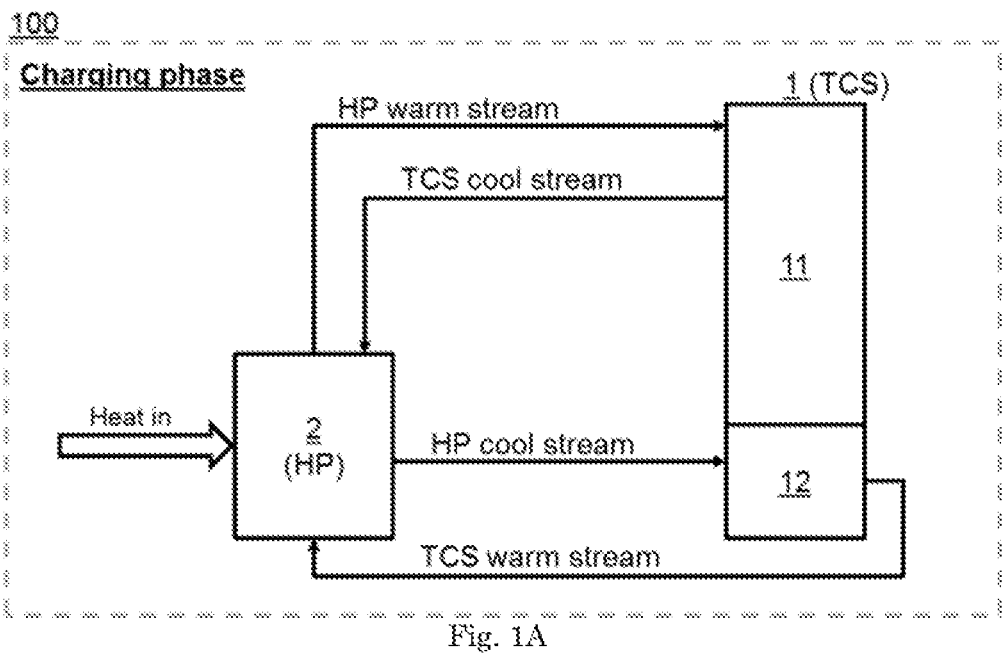

(51) Int. Cl.
*F25B 17/10* (2006.01)
*F25B 30/02* (2006.01)
*F25B 30/06* (2006.01)

(58) Field of Classification Search
USPC .......................................................... 62/79
See application file for complete search history.

(56) References Cited

OTHER PUBLICATIONS

Written Opinion issued May 11, 2021 in PCT/NL2021/050116.
Ard-Jan de Jong et al. Energy Procedia 48 (2014) 309-319.
Ard-Jan de Jong et al. Energy Procedia 91 (2016) 128-137.

* cited by examiner

HIGH-COP HEAT PUMP WITH THERMOCHEMICAL STORAGE SYSTEM

CROSS-REFERENCE TO RELATED APPLICATION

This application is a Section 371 of International Application No. PCT/NL2021/050116 filed Feb. 19, 2021, which was published in the English language Aug. 26, 2021, under International Publication No. WO 2021/167463 A1, which claims priority to European Patent Application No. 20158252.5 filed Feb. 19, 2020, the disclosures of which are incorporated herein by reference in their entireties.

The invention is in the field of energy storage and supply systems and of methods to operate these systems. The invention relates in particular to such systems comprising a thermochemical heat storage.

Energy devices such as heat conversion and heat storage devices enable the storage and later delivery of energy in the form of heat. For instance, heat storage devices can store excess of heat during the summer period and release the stored heat during the winter period. Alternatively, for cooling purposes, the heat stored in the charging process can be immediately released after the charging is finished in order to create a cooling effect in another part of the system. This is typically the method used in cooling or chiller devices or heat pumps.

Examples of known energy devices include hot water tanks (boiler technology), lithium-ion batteries and thermochemical storage (TCS) devices, chillers and heat pumps. An example of a system for storing and/or transporting energy is for instance disclosed in US2010/0205981, comprising a charging station, discharging station and storage part, wherein the storage part is made as a reactor part of a chemical heat pump.

Thermochemical energy storage is particularly advantageous due to its relatively high energy storage density, its relatively low-cost price per stored energy quantity and wide range of working temperatures with respect to other energy storage and conversion devices. In addition, the loss of energy during prolonged storage is minimal for thermochemical energy storage devices.

Thermochemical energy devices are typically based on reversible chemical reaction and/or sorption processes. During the charging of the device (i.e. the storing of heat) an endothermic reaction or desorption occurs by consuming heat. During the discharging of the device (i.e. release of heat), the reverse process, an exothermic reaction or sorption occurs and heat is released. Examples of typical chemical reaction and/or sorption processes for thermochemical heat storage are i.a. described in Cot-Gores et al., Renewable and Sustainable Energy Reviews 16 (2012) 5207-5224, which is incorporated herein in its entirety.

An example of an incorporated thermochemical heat storage system is disclosed in US2019/0383563, where a system is described to recover waste heat from air conditioning/refrigeration systems by storing the heat as chemical energy. EP3299759 discloses a heat exchanger system for thermochemical storage and release comprising a thermochemical module comprising a channel structure to provide an exchange of the sorbate to a compartment structure comprising a thermochemical material. However, the overall efficiency of the heat storage and supply remains limited.

A challenge associated with certain thermochemical energy devices is that during discharging the stored heat, a part of the device generally loses heat, which requires heating this part of the device. For instance, thermochemical energy devices that are based on an endothermic sorption reaction generally require the evaporation of a liquified sorbate (generally at a pressure near vacuum), due to which the temperature of the liquid sorbate can drop to a point that it even solidifies. Accordingly, in certain thermochemical energy devices, the sorbate is added to the thermochemical material (sorbent) in a gaseous state. In this way, the condensation energy of the sorbate adds to the reaction enthalpy. In order to evaporate the sorbate, it is generally first evaporated using a low-temperature heat source. As such, discharging the stored heat from a thermochemical energy device generally also requires the provision of external low-temperature heat (see for instance also Ard-Jan de Jong et al. Energy Procedia 48 (2014) 309-319 and Ard-Jan de Jong et al. Energy Procedia 91 (2016) 128-137). A conventional solution that is offered to this challenge is the provision of heat from a ground source, for instance by a borehole comprising ground heat exchangers to extract low-temperature heat (e.g. of about 10° C.) from the soil. Drawbacks however of using such boreholes are the high costs and the requirement of having a suitable soil to dig a borehole.

The present inventors found that the provision of low-temperature heat can favorably be provided by a heat pump. It was surprisingly found that this not only addresses at least one of the above-mentioned drawbacks, but that this can also result in a very efficient overall heat storage and supply.

Accordingly, the present invention is directed to an energy storage and supply system (100) comprising a combination of a heat pump (HP) (2) and a thermochemical storage (TCS) (1) unit.

It was found that arranging this system and operating it in a certain manner, may be very beneficial in terms of overall performance, as explained herein below in more detail. A further aspect of the present invention is therefore directed to a method for operating the energy storage and supply system, wherein said method comprises charging and discharging phases which both comprise providing a HP warm stream by the HP and leading said HP warm stream to the TCS unit to respectively thermally charge and discharge said TCS unit. Thus, during both the discharge phase and the charge phase, a HP warm stream is led from the HP to the TCS unit.

Figure 1B:
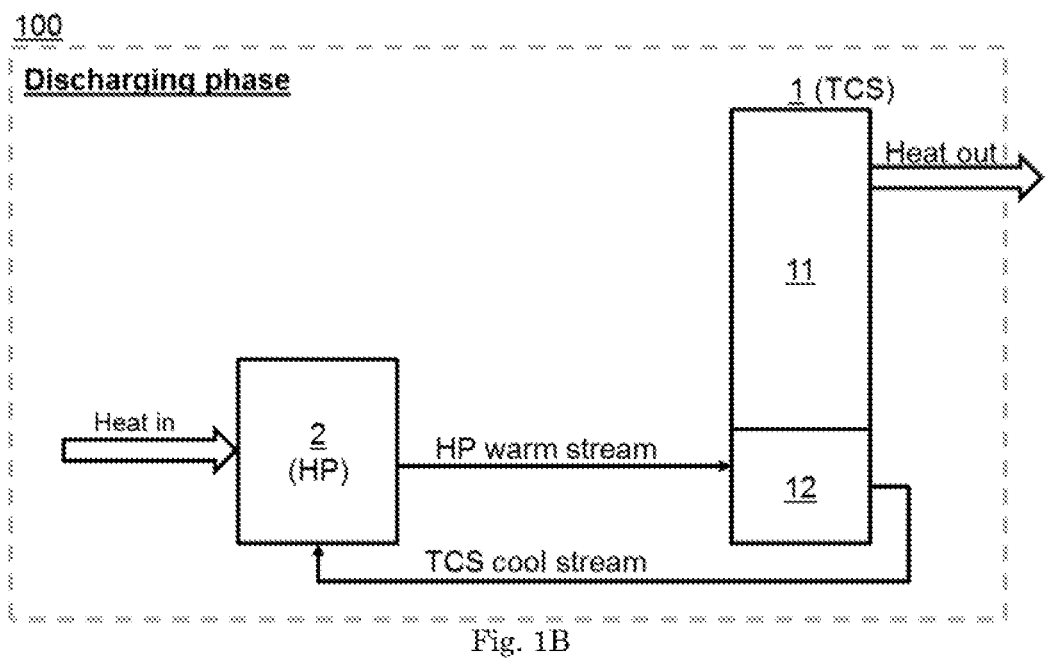

FIGS. 1A and 1B schematically illustrate preferred embodiments of respectively charging and discharging the energy storage and supply system according to the present invention.

Figure 2A:
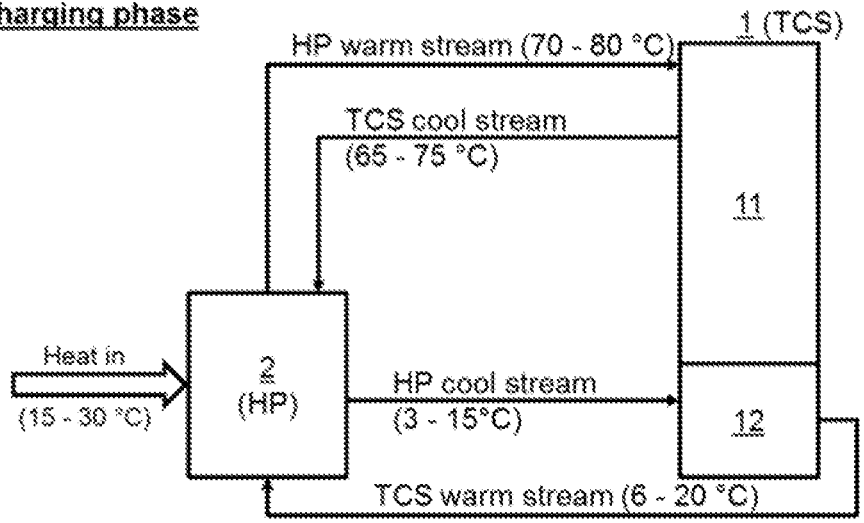
Figure 2B:
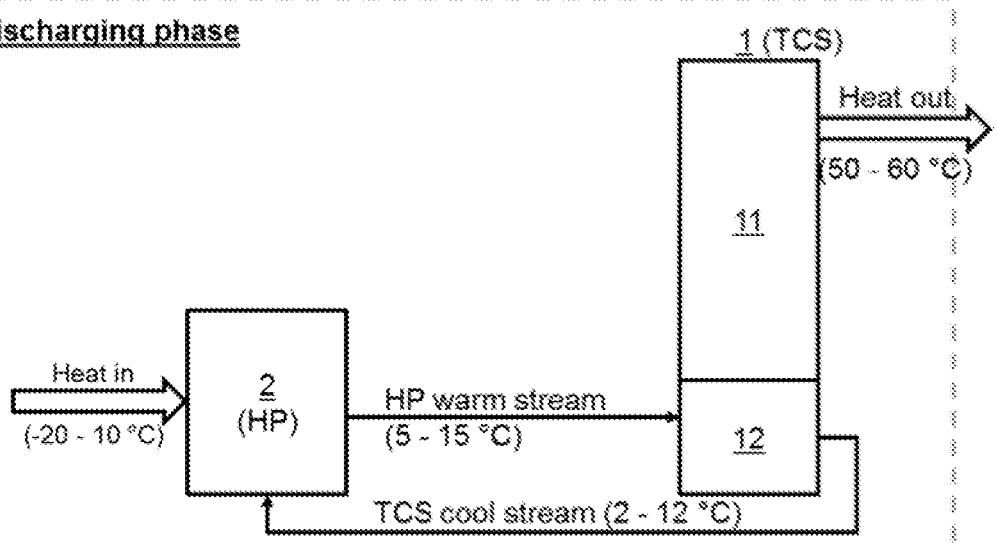

FIGS. 2A and 2B schematically illustrate more preferred embodiments of respectively charging and discharging the energy storage and supply system according to the present invention.

Figure 3:
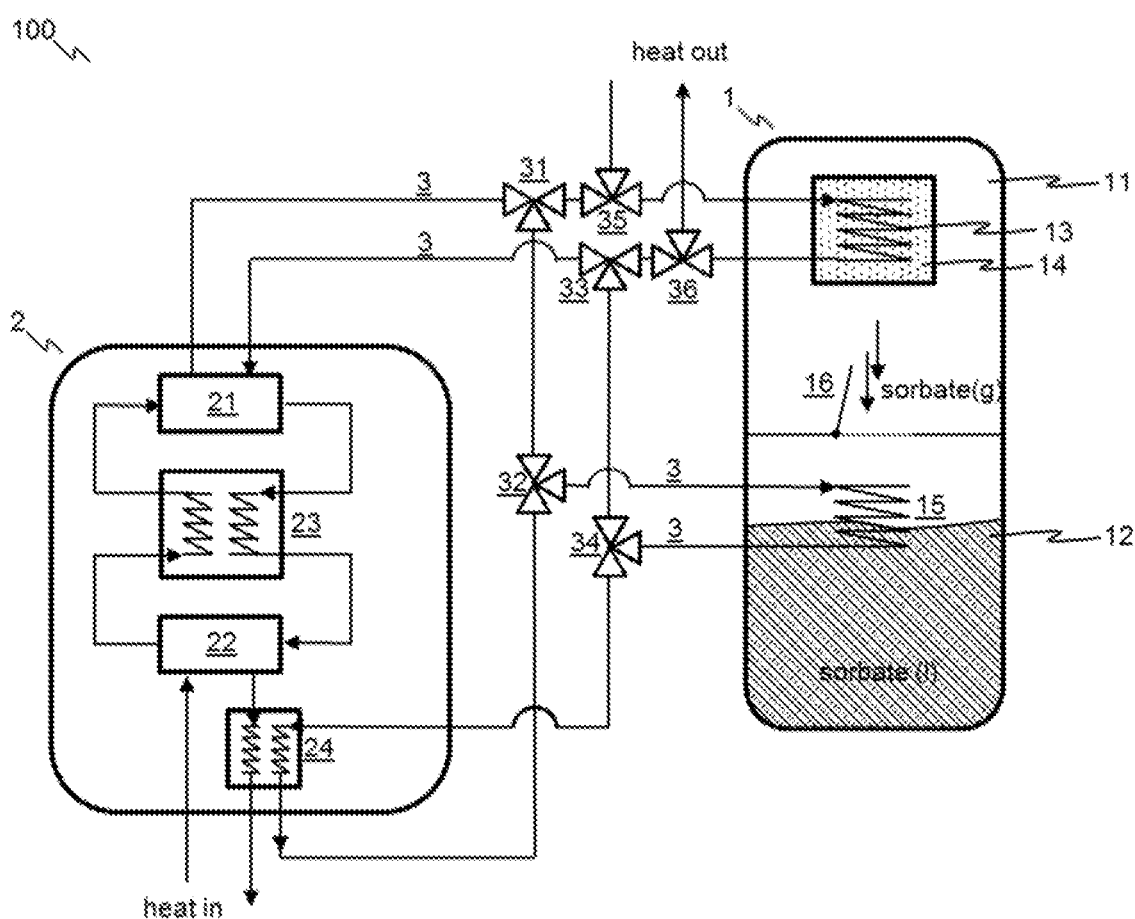

In FIG. 3, a particular embodiment of the energy storage and supply system according to the invention is illustrated.

Figure 4A:
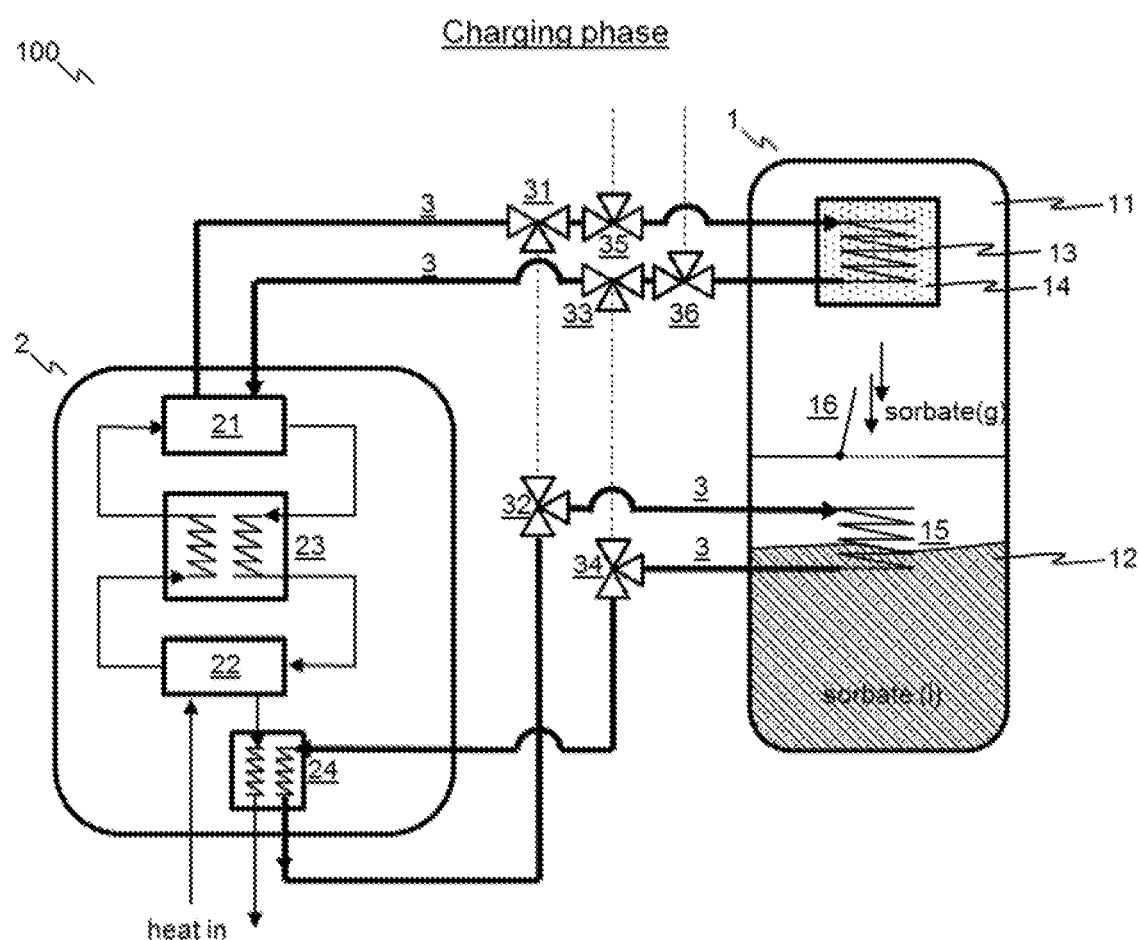
Figure 4B:
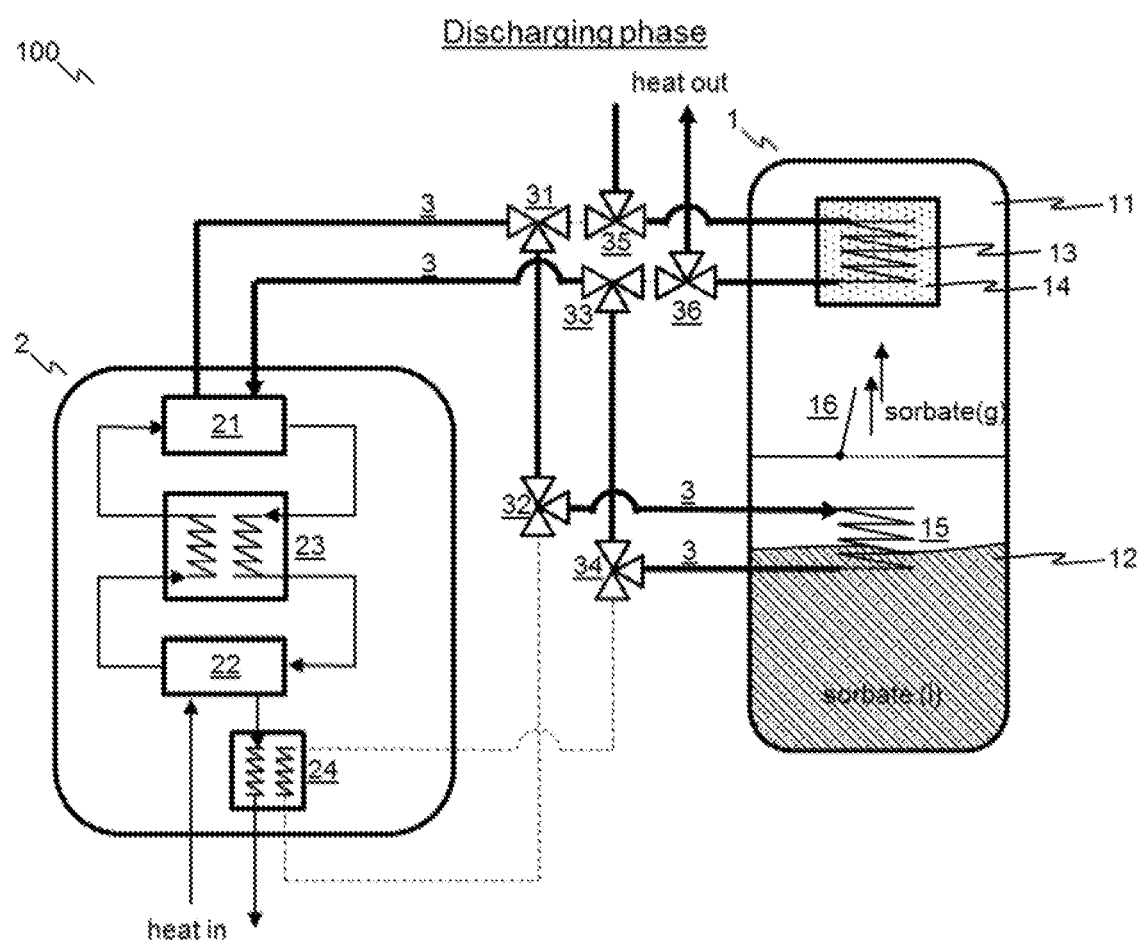
Figure 4C:
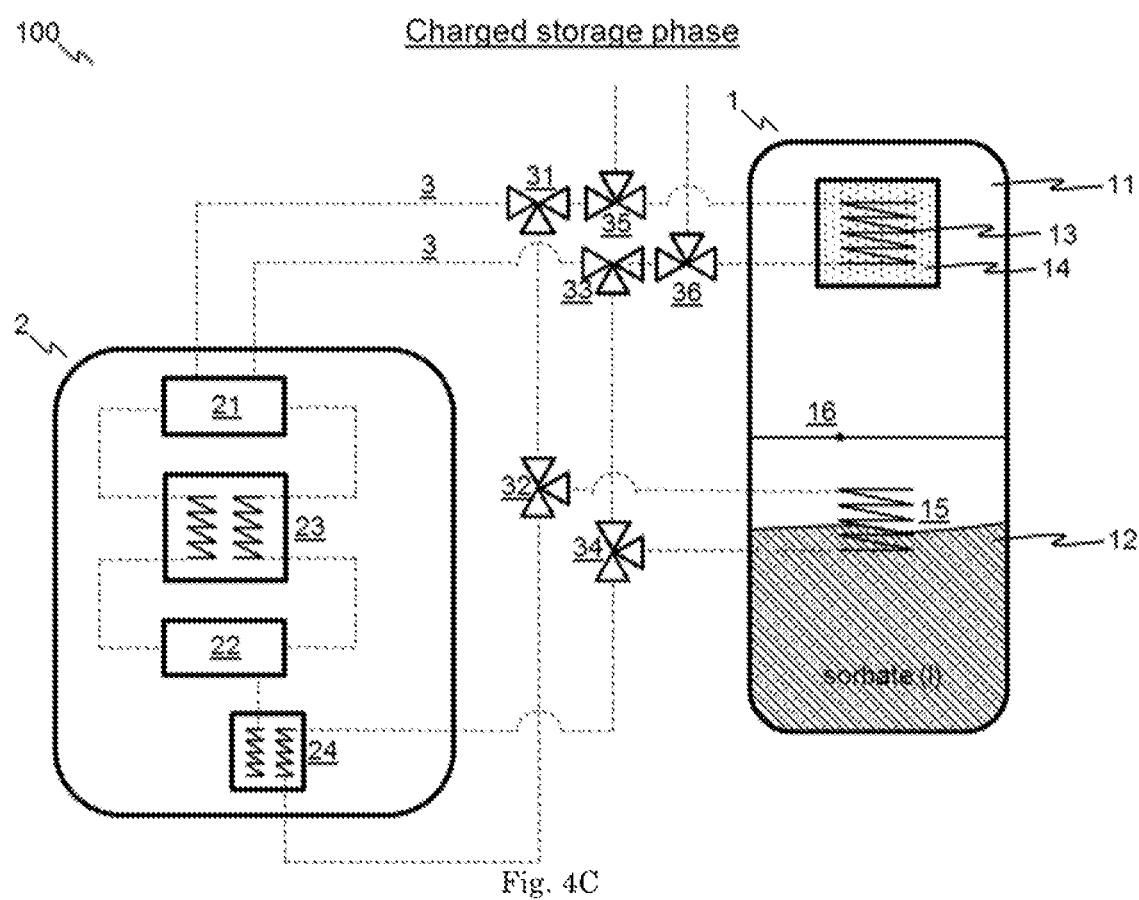

FIGS. 4A-4C illustrate the system as illustrated in FIG. 3 in various stages.

Heat pumps generally operate most efficiently at relatively small temperature differences between an input heat stream and an output heat stream ($\Delta T$). Since most TCS units need to be charged with a warm stream at a temperature that is much higher than that of the outside temperature, the HP may at first sight seem to not operate very efficiently. For instance, if the input heat stream has a temperature of about 7° C. and the output heat stream has a temperature of 80° C., the coefficient of performance (COP) can be 3.3 for specialized HPs containing a sub-cooler (see e.g. Choyu Watanabe et al. 12th IEA Heat Pump Conference (2017) O.3.3.2). For heat pumps without a sub-cooler, the COP may be dramatically lower during operation at the mentioned temperatures. At first sight, combining a HP and TCS unit therefore may not seem particularly advantageous. However, the present inventors realized that if the HP is used to both charge and discharge the TCS unit, the overall performance of the HP in combination with the TCS can be very good. If for instance during charging of the TCS unit, the COP is 3.3 or lower, during the discharge phase, which is generally carried out when the amount of renewable energy in the energy mix is unfavorably low (e.g. during winter) or when grid demand is high, the HP warm stream is only required at relatively low temperature, such that the system may have a very high combined COP of about 15 (about 10 for the HP operating at low temperature differences and 1.5 for the TCS system). This leads to a lower demand by the system from the energy grid compared to conventional systems for comparable heat demands. Thus, by leading the HP warm stream to the TCS unit during both the charging and discharging phases, a very high overall performance can be achieved and most advantageously, the combined COP (i.e. the COP of the HP and TCS combination) is particularly good at times of alternative energy scarcity.

In general, two types of heat pump systems exist: ground source heat pumps and air source heat pumps (herein also referred to as GSHP and ASHP, respectively). Like the conventional TCS as described herein-above, GSHPs comprise a borehole comprising heat exchangers, making the pumps generally expensive and cumbersome. However, the advantage of GSHPs is that during the winter periods, the temperature of the heat input is relatively high (e.g. about 10° C.) with respect to the air temperature, which results in a favorable COP when the HP is used to provide heat of about 30-50° C. in a stand-alone situation (i.e. without a TCS unit). On the other hand, ASHPs suffer from a relatively low COP (values may drop below 2 or even below 1.5) when used in such a stand-alone situation, as the air temperature may be sub-zero and is typically in the range of −20 to 10° C. Accordingly, when HPs are used as stand-alone solution to provide heat to buildings, GSHPs are generally used for their more favorable COP. However, the present inventors surprising found that by combining an ASHP and a TCS unit in accordance with the present invention, a favorably high combined COP can still be achieved during the discharging phase, while mitigating the drawbacks associated with GSHPs (i.a. the expensive borehole comprising heat exchangers). Namely, during the winter period, the TCS can provide the majority of high-temperature heat for heating the building and/or domestic hot water supply, while the ASHP can be allowed to very efficiently provide only a low-temperature heat output stream, as this only needs to be sufficient to evaporate the sorbate and thereby discharge the TCS unit. Accordingly, in a preferred embodiment of the present invention, the heat pump is an air source heat pump.

In a typical embodiment of the present invention, the TCS unit is based on sorption and desorption of a sorbate. The sorbate can for instance be water, which is sorbed by a sorption material such as zeolite, a metal organic framework or a hygroscopic salt. Examples of hygroscopic salts and their hydrates that can typically be employed for this purpose are $Na_2S$, $Al_2(SO_4)_3$, $CaO$, $Me_xCl_y$ (wherein Me is a metal, resulting in e.g. $CaCl_2$, $MgCl_2$, $MnCl_2$, and the like), $K_2CO_3$, $MgSO_4$, $MgO$, $SrBr_2$, $Na_3PO_4$, $KAl(SO_4)_2$ $NH4Al(SO_4)_2$, $NH_4Fe(SO_4)_2$ (alums), and the like. $Na_2S$ is preferred for its high energy density, low cost and favorable operating temperatures. Charging the hygroscopic salt with heat by evaporating the sorbate from the salt crystals may be carried out at various temperatures, but a temperature of more than 65° C., such as about 80° C. is not uncommon. However, regular HPs generally perform relatively poorly at such output temperatures or are even not capable of providing an output stream of such high temperature. This is particularly the case, if the temperature of the stream returning to the HP is high (e.g. about 77° C.). Therefore, it is preferred that the HP is a high temperature HP (HTHP) that is adapted to perform at relatively high COP when the HP generates a warm stream at relatively high temperature while receiving a returning cool stream at only a slightly lower temperature. High temperature HPs that can be used in the present invention typically comprise modules or arrangements that usefully distribute or sink heat that is received back from the TCS. Examples thereof include HPs comprising one or more sub-coolers (also referred to as an inter-cooler), multistage compressors, multistage heating and combinations thereof. Suitable HPs are for instance described in Choyu Watanabe et al. 12th IEA Heat Pump Conference (2017) 0.3.3.2 and references cited therein, including C. Arpagaus, et al. International Journal of Refrigeration 69 (2016) 437-465. The sub-cooler enables for instance a heat exchange between a spent heat exchange fluid (i.e. flowing from an evaporator of the HP) to a heated heat exchange fluid (i.e. flowing from a condenser of the HP), thereby optimizing the COP of the HP by increasing the temperature difference between the spent heat exchange fluid and the input heat source. Employing the HP with a sub-cooler, multistage heater and/or multistage compressor is particularly preferred in embodiments wherein the sorption material comprises $Na_2S$ because the temperature at which $Na_2S$ dihydrate is efficiently dried to $Na_2S$ hemihydrate or anhydrate at relevant condensation conditions is about 75 to 80° C., in which case sub-cooling is particularly favorable.

The present invention advantageously allows charging with relative high COP, in particular when the system includes the HTHP as described herein. The HTHP allows the charging to take place with a COP of up to 3.3 or higher. The discharge phase that is generally carried out when the amount of renewable energy in the energy mix is low (e.g. during winter) or when grid demand is high, can proceed with an overall COP, e.g. of about 15.

In embodiments wherein the TCS unit is based on sorption and desorption of a sorbate, as schematically illustrated in FIG. 1A, the method according to the charging phase typically comprises providing a HP warm stream by the HP and leading said HP warm stream to an energy storage compartment (11) of the TCS unit to charge said TCS unit with heat by desorbing a sorbed sorbate of a sorption material (14) that is located in said energy storage compartment and condensing said desorbed sorbate in a liquid storage compartment (12). In a preferred embodiment, the charging phase further comprises providing a HP cool stream and leading said HP cool stream to the TCS unit to charge the TCS unit, preferably to the liquid storage compartment (12). The cool stream can be obtained by exchanging heat from the depleted heat input stream which the HP used to extract heat from its low temperature source (i.e. the outflowing air in case of an ASHP). Advantageously, the cool stream can be used in the liquid storage compartment to condense the desorbed sorbate by removing heat from this compartment by recirculating the stream back to the HP as a TCS warm stream, as also illustrated in FIG. 1A.

In FIG. 1B, a typical discharging phase in accordance with the present invention is illustrated. This discharging phase comprises providing a HP warm stream by the HP and leading said HP warm stream to the liquid storage compartment (12) of the TCS unit to discharge said TCS unit by evaporating the desorbed sorbate in the liquid storage compartment and sorbing said evaporated sorbate in the energy storage compartment (11) at the sorption material. A TCS cool stream that is generated by the evaporation of the sorbate in the TCS, can be led from the liquid storage compartment (12) to the HP.

The energy storage and supply system can be operated at various temperatures, depending i.a. on the sorption material. For charging a sorption material that comprises sodium sulfide with a sorbate comprising water, the sorption material is preferably heated in the range of 70 to 80° C., while the evaporated water is then preferably condensed at a temperature in the range of 5 to 15° C. As such, the hemihydrate or anhydrate can be efficiently formed. Other sorption materials, e.g. $K_2CO_3$, particular alums or $Na_3PO_4$ may be charged at slightly lower temperatures, e.g. at 50° C. or higher, for instance up to 130° C.

Accordingly, as illustrated in FIG. 2A, during the charging phase of a system that is based on $Na_2S$ and water (or on a combination of a sorbate and a sorption material that can be operated at similar temperatures), the HP warm stream may have a typical temperature in the range of 50 to 130° C., such as 70 to 80° C., while the HP cool stream may then have a temperature in the range of 3 to 15° C., or even lower. The lower the temperature of the HP cool stream, the more effective the cooling and hence the condensation in the TCS unit. Heating the energy storage compartment (11) of the TCS unit with the HP warm stream at a temperature range as mentioned, typically results in a TCS cool stream that has a temperature of only up to 10° C. (e.g. about 5° C.) below the HP warm stream, thus for instance in the range of 65 to 75° C. As elaborated herein-above, the HP (2) for this reason is preferably a HTHP, and more preferably comprises the sub-cooler. Since, the temperature of the heat in stream during warmer outside temperatures (e.g. summer) will be about 15 to 30° C., the COP may be around 3.3. Cooling the condenser in the liquid storage compartment (12) typically results in a TCS warm stream that has a temperature of only up to 10° C. higher than the HP cool stream, for instance in the range of 6 to 20° C.

The discharging phase of a system that is based on $Na_2S$ and water (or on a combination of a sorbate and a sorption material that can be operated at similar temperatures) can be carried out with temperatures as illustrated in FIG. 2B. During the cooler outside temperature periods (e.g. winter), the temperature of the heat in stream can be in the range of −20 to 10° C. The HP warm stream which is then led to the liquid storage compartment (12) of the TCS unit to discharge said TCS unit by evaporating the desorbed sorbate in the liquid storage compartment can then be about 5 to 15° C., or even higher. At such temperatures, the water can efficiently be evaporated because of the pressure conditions inside (near vacuum). The resulting TCS cool stream that is recycled back to the HP, then typically has a temperature in the range of 2 to 12° C. Sorption of the obtained evaporated sorbate in the energy storage compartment (11) at the sorption material can then result in a heat out stream having a temperature in the range of 50 to 60° C. or even higher. Given a COP of the HP of at least 2.5 and up to 10 in providing the HP warm stream at these low temperatures, and an additional COP of about 1.5 of the TCS unit itself due to the enthalpy of the sorbate reacting to the sorbent is about a factor of 1.5 higher than the condensation enthalpy only (depending on the used salt), the discharging phase of the TCS may have a combined COP above 5, and even up to 10 or higher. It may even have a combined COP of about 15 or more. This is remarkably higher than conventional air source heat pump systems having a COP of about 1-3 and conventional ground source heat pump systems having a COP of about 3-5 at similar temperature requirements.

A further aspect of the present invention is directed to the energy storage and supply system (100) that comprises the combination of the heat pump (HP) (2), preferably the air source heat pump, and the thermochemical storage (TCS) (1) unit which is adapted for storing and supplying energy in accordance with the method described herein.

The HP and TCS units as used herein may be HP and TCS units as individually known in the art. It may be appreciated that the system according to the present invention may comprise multiple TCS units connected to one or more HP units. Further, the TCS unit may comprise one or more energy storage compartment and/or liquid storage compartments. For instance, a particular TCS unit may comprise one liquid storage compartment that is connected to multiple energy storage compartments.

In FIG. 3, a preferred embodiment of the system of the present invention is illustrated. The HP (2) is in thermal connection to the TCS (1) such that a HP warm stream generated by the HP can be led to an energy storage compartment (11) and/or to a liquid storage compartment (12) of said TCS unit. In addition, the HP (2) can be in thermal connection to the TCS unit (1) such that a HP cool stream can be led to a liquid storage compartment (12) of said TCS unit.

The energy storage compartment (11) comprises the sorption material (14) adapted such that it can be charged with heat via a first TCS heat exchanger (13) that is in thermal connection to a HP condenser (21) in the HP. The first TCS heat exchanger (13) can further be switchably connected to a system (e.g. a hot water buffer and/or a central heating system) via valves 35 and 36. The liquid storage compartment (12) comprises a second TCS heat exchanger (15) which can be in thermal connections to both the HP condenser (21) and a HP evaporator (22) via a HP heat exchanger (24), which use is described in more detail herein-below. By the controllable thermal connectivity of the second TCS heat exchanger (15) to the HP condenser (21) and the HP evaporator (22), it can be controlled whether the second TCS heat exchanger (15) is supplied with the HP warm stream or with the HP cool stream, as respectively applicable during the discharging and charging phases. The TCS unit further comprises a valve unit (16) which can be closed during storage of the thermal energy.

The HP (2) as illustrated in FIG. 3, may further comprise a sub-cooler (23), that is adapted such that a heat exchange can take place between a spent heat exchange fluid flowing from the condenser (21) to a heated heat exchange fluid flowing from the evaporator (22) of the HP, thereby optimizing the COP of the HP as described herein-above. The condenser (21) and evaporator (22) of the HP typically comprise heat exchangers that are not separately drawn in FIGS. 3-4 The optionally additional heat exchanger 24 allows to advantageously tune the temperature levels and energy balance between the HP and the TCS unit.

Examples of suitable thermal connections means include a piping or tubing system through which a heat transfer fluid such as water can flow in combination with pumps and valves. Further, the system of the present invention may comprise compressors, expansion valves and the like that are commonly known to be employed in heat pump systems and/or TCS units. In FIG. 3, the possible thermal connections are indicated by the arrowed lines, leading from the TCS unit to the HP and vice versa. These arrowed lines represent thermal connections means (3) which may comprise one or more multi-way valves (31-36) to i.a. control which element of the TCS unit is connected to which element of the HP. The thermal connection means as possibly in use during charging and discharging is illustrated in FIGS. 4A and 4B respectively. In FIG. 4C, an at least partially charged state of the system is illustrated, wherein none of the thermal connections are typically in use, while the valve unit (16) is closed such that the heat remains stored. In these figures, the thermal connection means in use are indicated by the thick, solid arrowed lines, while the inactive thermal connections means are indicated by the thin, dashed lines. Variations on the thermal connections means and in particular on the usage of valves and the like may be well possible.

Thus as for example illustrated in FIG. 4A, during the charging phase, heat is taken up by evaporator (22) of the HP, while no heat stream flows out of the TCS units. However, during the discharge phase, as illustrated in FIG. 4B, valves 35 and 36 are switched such that the heat that is generated by the sorption of the sorbate by the sorption material is allowed to be flown out of the TCS units (heat out), e.g. to a water buffer tank or directly to a thermal network. During the storage phase, as illustrated in FIG. 4C, valve 16 can be closed and no heat is transported between the HP and the TCS.

In a particular embodiment, the energy storage and supply system further comprises a water buffer tank thermally connected to the TCS unit and/or to the HP for more efficient short term storage. Thus, advantageously, the HP may also be directly connected to the water buffer (i.e. without the TCS being connected in between). Moreover, additionally or alternatively, the HP may be directly connected to central heating system (i.e. without the TCS being connected in between). By directly connecting the HP to the water buffer tank and/or the central heating system, the HP may be used to directly provide heat and/or cooling, without intermediate involvement of the TCS.

For the purpose of clarity and a concise description features are described herein as part of the same or separate embodiments, however, it will be appreciated that the scope of the invention may include embodiments having combinations of all or some of the features described.

As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features.

The invention claimed is:

1. Method for operating an energy storage and supply system (100) comprising a combination of a heat pump (HP) (2) and a thermochemical storage (TCS) (1) unit, wherein said method comprises charging and discharging phases which both comprise providing a HP warm stream by the HP and leading said HP warm stream to the TCS unit to respectively thermally charge and discharge said TCS unit.

2. Method according to claim 1, wherein said charging phase further comprises providing a HP cool stream and leading said HP cool stream to the TCS unit to charge the TCS unit, preferably to the liquid storage compartment, for condensing the sorbate.

3. Method according to claim 1, wherein the heat pump comprises a high temperature heat pump, preferably a heat pump comprising a sub-cooler (23), a multistage heater and/or multistage compressor.

4. Method according to claim 1, wherein the heat pump comprises an air source heat pump.

5. Method according to claim 1 wherein, during the charging phase, the HP warm stream has a temperature in the range of 50 to 130° C. such as 70 to 80° C., while preferably the HP cool stream has a temperature in the range of 3 to 15° C., or lower.

6. Method according to claim 1 wherein, during the discharging phase, the HP warm stream has a temperature in the range of 5 to 15° C., or higher.

7. The method according to claim 1 having a coefficient of performance above 5, preferably above 10, more preferably above 14 during the discharging phase.

8. Energy storage and supply system (100) comprising a combination of a heat pump (HP) (2) and a thermochemical storage (TCS) (1) unit, adapted for storing and supplying energy with a method in accordance with claim 1, adapted such that the HP can be in thermal connection to the TCS unit and a HP warm stream generated by the HP can be led to the TCS unit, preferably to an energy storage compartment (11) and/or a liquid storage compartment (12) of said TCS unit, wherein said energy storage compartment comprises a sorption material (14) adapted such that it can be charged with heat via a first TCS heat exchanger (13) that is in thermal connection to a HP condenser (21) in said HP, wherein the liquid storage compartment comprises a second TCS heat exchanger (15) which is in thermal connection to both said HP condenser (21) and a HP evaporator (22) via a HP heat exchanger (24) and wherein said TCS unit further comprises a valve unit (16) which can be closed during storage of the thermal energy.

9. Energy storage and supply system according to claim 8, wherein the first TCS heat exchanger (13) is switchably connected to a further system via valves (35, 36).

10. Energy storage and supply system according to claim 8, wherein a HP cool stream can be led to the liquid storage compartment (12) of said TCS unit.

11. Energy storage and supply system according to claim 8 wherein the heat pump is an air source heat pump, and preferably comprises a sub-cooler.

12. Energy storage and supply system according to claim 8, wherein the TCS unit (1) comprises a hygroscopic salt, preferably $Na_2S$.

13. Method according to claim 1, wherein said charging phase comprises providing a HP warm stream by the HP and leading said HP warm stream to an energy storage compartment (11) of the TCS unit to charge said TCS unit with heat by desorbing a sorbed sorbate of a sorption material (13) that is located in said energy storage compartment and condensing said desorbed sorbate in a liquid storage compartment (12);

and wherein said discharging phase comprises providing a HP warm stream by the HP and leading said HP warm stream to the liquid storage compartment (12) of the TCS unit to discharge said TCS unit by evaporating the desorbed sorbate in the liquid storage compartment and sorbing said evaporated sorbate in the energy storage compartment (11) at the sorption material.

14. Method according to claim 13, wherein the sorption material (13) comprises a zeolite, metal organic framework, or a hygroscopic salt, preferably $Na_2S$.

15. Method according to claim 14, wherein said charging phase further comprises providing a HP cool stream and leading said HP cool stream to the TCS unit to charge the TCS unit, preferably to the liquid storage compartment, for condensing the sorbate.

16. Method according to claim 14, wherein the heat pump comprises a high temperature heat pump, preferably a heat pump comprising a sub-cooler (23), a multistage heater and/or multistage compressor.

17. Method according to claim 14, wherein the heat pump comprises an air source heat pump.

18. Method according to claim 13, wherein the sorbate comprises water, ammonia, methanol or ethanol, preferably water.

19. Method according to claim 18, wherein said charging phase further comprises providing a HP cool stream and leading said HP cool stream to the TCS unit to charge the TCS unit, preferably to the liquid storage compartment, for condensing the sorbate.

20. Method according to claim 18, wherein the heat pump comprises a high temperature heat pump, preferably a heat pump comprising a sub-cooler (23), a multistage heater and/or multistage compressor.

* * * * *